United States Patent [19]

Hassanzadeh et al.

[11] Patent Number: 4,931,740
[45] Date of Patent: Jun. 5, 1990

[54] ELECTROSTATIC FIELD GRADIENT SENSOR

[75] Inventors: Reza Hassanzadeh, Chesterfield; Donald G. Funderburk, St. Charles; Steven A. Schwartz, University City; Edward T. Rock, St. Louis, all of Mo.

[73] Assignee: McDonnell Douglas Corporation, St. Louis, Mo.

[21] Appl. No.: 227,160

[22] Filed: Aug. 2, 1988

[51] Int. Cl.$^5$ .................. G05D 1/10; G01P 3/42; G01R 5/28

[52] U.S. Cl. ..................... 324/457; 324/72; 324/109

[58] Field of Search ............ 324/457, 458, 109, 71.1, 324/72, 72.5; 340/561

[56] References Cited

U.S. PATENT DOCUMENTS

| | | | |
|---|---|---|---|
| 3,836,850 | 9/1974 | Coulter | 324/71.1 |
| 3,928,801 | 12/1975 | Hill | 324/457 |
| 4,067,520 | 1/1978 | Hill | 324/457 |
| 4,760,343 | 7/1988 | Vaillancourt | 324/458 |
| 4,772,851 | 9/1988 | Schattschneider | 324/71.1 |

FOREIGN PATENT DOCUMENTS 0239154 10/1986 Japan .................. 324/71.1

Primary Examiner—Reinhard J. Eisenzopf
Assistant Examiner—Jose M. Solis
Attorney, Agent, or Firm—Cohn, Powell & Hind

[57] ABSTRACT

A sensor for measuring disturbances to an electrostatic field caused by the intrusion of a charged body or a charge producing body. The sensor employs at least two probes displaced from each other which have attached beads of radioactive material to provide free ions in the vicinity of the probe. The free ions enhance the signal created by each probe when it is affected by a disturbance in the electrostatic field in which it resides. The signals thus created are conditioned for transmission to a differential amplifier which combines them and produces an output signal which represents the detection of an intruding charged body, its distance, and its characteristics. The sensor can be configured with more than two probes seeded or placed in an array and a computer for real-time selection of the two yielding optimum signals for charged body location, velocity, direction of travel, and electrostatic signature.

21 Claims, 3 Drawing Sheets

ELECTROSTATIC FIELD GRADIENT SENSOR

FIELD OF THE INVENTION

This invention relates to the sensing of electrostatic fields, and more particularly, for detecting disturbances to an electrostatic field caused by a charge bearing or charge producing object entering the field.

BACKGROUND OF THE INVENTION

A charged body or charge producing body moving in an electrostatic field interacts with or disturbs that field. The interaction or disturbance can be detected at any point in the electrostatic field based on the principle's of Coulomb's law. These field effects can be readily modeled by derivation of equations based on Coulomb's law, as is well known to those skilled in the art. Thus, for example, a charged body or a body producing a charge, such as an aircraft moving through such a field can be detected by electrostatic detection means, such as an electrostatic gradiometer, located on another aircraft moving through the field relative to the first aircraft, or such a device located on the Earth.

Single and paired electrostatic field probes for measuring the magnitude of an external electrostatic field are well known in the art. Likewise, probe configurations and combinations to compensate for deleterious environmental and circuit intrinsic effects are known. A typical application of paired probes to an aircraft electrostatic field problem relates to determining the potential between an aircraft and electrical ground to ascertain the charge buildup on the aircraft skin that must be safely discharged. Further, skin charge buildup creates radio frequency interference. Thus, the use of an aircraft skin discharge system to bleed skin charge and effectively minimize its buildup is a necessity to protect personnel from high voltage shock and to reduce radio frequency interference to communications and to on-board avionics equipment. Skin charge can create a voltage differential between an aircraft and the ambient environment as high as 160 kilovolts unless reduced in some measure by means of charge bleed-off The disclosure of U.S. Pat. No. 4,005,357 is incorporated by reference herein The use of one or more probes to determine the presence, location, and gross or specific identity of a charge bearing or charge generating vehicle such as an aircraft moving into the electrostatic field in which said probes are located does not appear to be known in the art.

An aircraft is an example of a particular type of charged body or charge producing body which, when moving in an electrostatic field, will disturb that field in a manner which will permit its detection by means of a field gradiometer system such as the subject invention. Whether fixed wing or helicopter, a moving aircraft picks up a measurable amount of body or skin charge. The skin charge is typically negative. In addition to skin charge, a powered aircraft typically produces engine exhaust stream ions. Exhaust stream charge occurs generally as a function of throttle position. Thus, when the throttle is positioned for acceleration, the engine exhaust contains charged particles giving it a net positive charge. The flow of these charged particles in the exhaust stream can presently be measured with existing devices as currents ranging from 50 to 400 microamperes. The positive exhaust stream charge is generally less in absolute magnitude than the negative skin charge.

It should be recognized that both environmental and aircraft operating conditions will affect the amount of charge created on the aircraft skin or in the engine exhaust. Thus, an aircraft skin discharge system may bleed skin charge to effectively minimize its buildup. Throttle control, on the other hand, is one means of minimizing exhaust stream charge buildup. However, the need for exhaust stream charge and skin charge management for the purpose of detection avoidance has not been an issue in the prior art. The present invention is capable of detecting aircraft whether charge management is employed or not.

In addition to determining the presence of a charged body, such as an aircraft, moving in an electrostatic field, and determining its operating characteristics, experiments have shown that particular types of aircraft, and particular models create recognizable signatures based on skin charge and exhaust plume charge, as a result of their interaction with an electrostatic field. Obviously, other types of vehicles which move and which have ion producing engine exhausts, such as tanks, will similarly create electrostatic field disturbances or interactions peculiar to such vehicles and which can be detected and recognized with the subject invention.

In the present invention the electrostatic field detectors are employed in pairs with one detector physically spaced a known distance from the other, optimally determined for a particular application. The detectors can also be employed in arrays or other ordered arrangements, including orthogonal arrays, or for some applications they may be seeded, randomly or otherwise in a manner constituting unordered array placement. Where more than a two detector system is involved, a means is required for processing the signals in the multi-detector arrangement or unordered placement, to determine the optimum signals which in combination produce an output representing a signature containing characteristics of the charged body moving in and disturbing the field. Such signal processing technology, presently evolving in the state of the art. is directly applicable to this concept.

The signals produced by each probe may be ion enhanced by placing a source of ionization on the probe. A radioactive material producing alpha particles, such as, for example, polonium, is used in the present invention to produce a charge or ion corona about the probe. When the field around the probe is then disturbed, charge flow within the probe is supplemented with charged particles from the corona, and thus increased. In general, however, probe signals are low level. Signal levels in the voltage mode of operation, versus the alternative current mode of signal measurement, are typically in the order of one milli volt per meter using a commercially available wide band measurement system. This system, using a 30 meter probe separation demonstrated target detection at approximately one kilometer. Calculations indicate that modern signal processing and devices should be capable of a signal detection range, for a typical aircraft charge, in excess of 30 nautical miles for a 10 meter probe seperation distance.

Whether the probes are mounted on an aircraft for detection of another aircraft or located on the ground, signal transmission cables connecting the probes to the signal processing elements of the invention, such as the high impedance amplifiers and differential amplifiers, or combinations of these amplifiers in an electrostatic voltmeter configuration must be kept short and selected for low loss transmission characteristics. Thus, cables having higher characteristic impedance, such as 75 ohm versus 50 ohm coaxial cable, and having low capacitance per unit length, provide better voltage signal transmission over greater distances. For particular applications such as remote relays, fiber optic and radio frequency links provide the necessary low loss signal transmission capability. In addition, for ground based probe arrays or seeded placements where the probes are spaced apart more than 10 meters, signal pre-conditioning, such as low noise pre-amplification or conversion to optical signals prior to transmission for further processing are employed. From the foregoing, and with an appreciation of the low magnitude of the signals produced by the electrostatic probes in the sensory portion of the invention, it should be understood that the signal processing function of the invention appearing between the output of said probes and the point at which signal information content is made usable by being presented on a display, is related to the application.

GENERAL DESCRIPTION

It is an object of the present invention to determine the presence of and characteristic or signature and any other information about a body bearing and producing electric charge by the disturbance it causes in an electrostatic field. Typically, the detection of a moving object or vehicle, such as an aircraft, in the environment is accomplished with active detection means such as, for example, radar or sonar. The present invention, unlike radar and sonar, performs passive detection in that it simply senses effects of an intruding charged body or charge producing body on the electrostatic field in which the sensor is placed. As a result of its passive character, the present invention is particularly useful in applications of a covert or secret nature where detection, identification, location, and course of an intruder is required without alerting the intruder. The invention further employs differential amplification for common mode rejection of undesirable environmental or intrinsic circuit produced interference signals. The present invention configured as an array or a seeded deployment using computer selection of optimum probe pairs and/or multiple probe processing, senses and provides intruder information over a wide area.

Other objects, features, and advantages of the present invention will be apparent from the following description of the invention in relation to the accompanying drawings in which.

DETAILED DESCRIPTION

Figure 1:
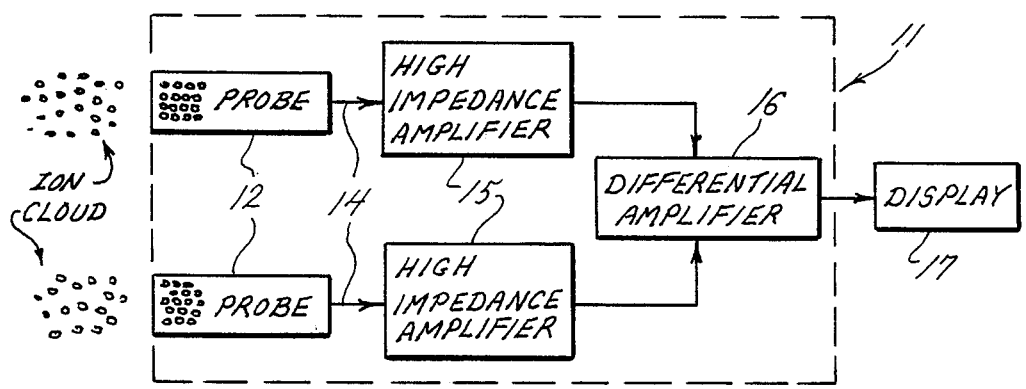
FIG. 1 is a block diagram of the sensor in its basic configuration.

Sensor 11 in FIG. 1 is comprised of two electrostatic probes 12 each of which is connected to its own high impedance amplifier 15 by means of signal links 14. The output of each high impedance amplifier 15 is connected to differential amplifier 16 which rejects undesirable common mode signals and combines differentially the two preamplified signals from probes 12 to produce a signal to display 17 which presents it as the electrostatic characteristic or signature of the charged body or charge bearing body detected by probes 12. The high impedance amplifier 15 and differential amplifier 16 are combined in a single package as a differential electrostatic voltmeter available from sources known to those skilled in the art. Display 17 is an analog plotter, but analog or digital display systems, with appropriate signal conversion and management capability, also readily available and known to those skilled in the art, can be used to depict the input signal from differential amplifier 16 as the electrostatic characteristic or signature of the detected body.

Figure 2:
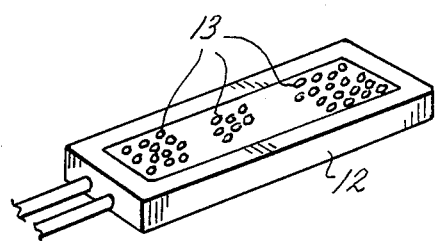
FIG. 2 is a view of the probe used in the sensor.

Probes 12 contain radioactive material encapsulated in beads 13 which are a source of alpha particles. The alpha particles provide a source of ions in the immediate vicinity of probes 12 in the form of a cloud or corona for the purpose of enhancing the signal output from each probe. The probe 12 is designed to provide mobile electrons so that when placed in a changing or disturbed electrostatic field an output current will be produced. The corona or cloud of free electrons created by the alpha particle source causes those electrons in close proximity to the probe to encourge electrons in the probe to move away via the probe output wires. The reason, of course, is the repulsion that occurs between particles of like charge. As probe electrons leave, corona electrons are immediately available to replace them. Thus, the signal enhancement effect is created. Polonium is the radioactive source of alpha particles used in the preferred embodiment of the present invention. The beads 13 containing Polonium are bonded to the surface of the probes 12 as shown in FIG. 2. In the preferred embodiment the probes 12 are Static Master Ionizing Units manufactured by Nuclear Products Company of El Monte, Calif., U.S.A.

Figure 3:
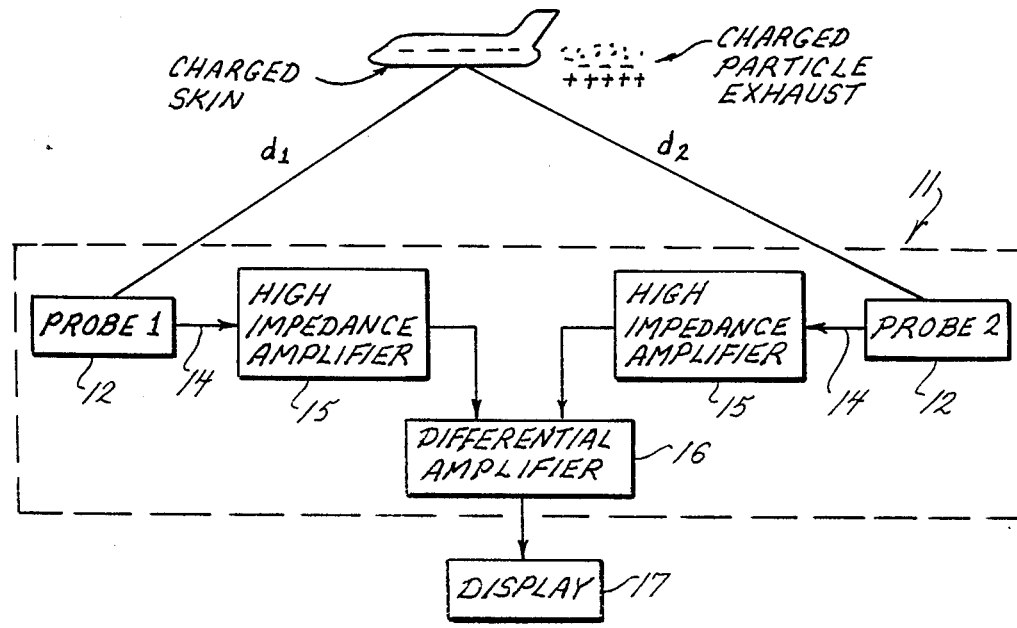
FIG. 3 is a spatial arrangement of a sensor application.
Figure 4:
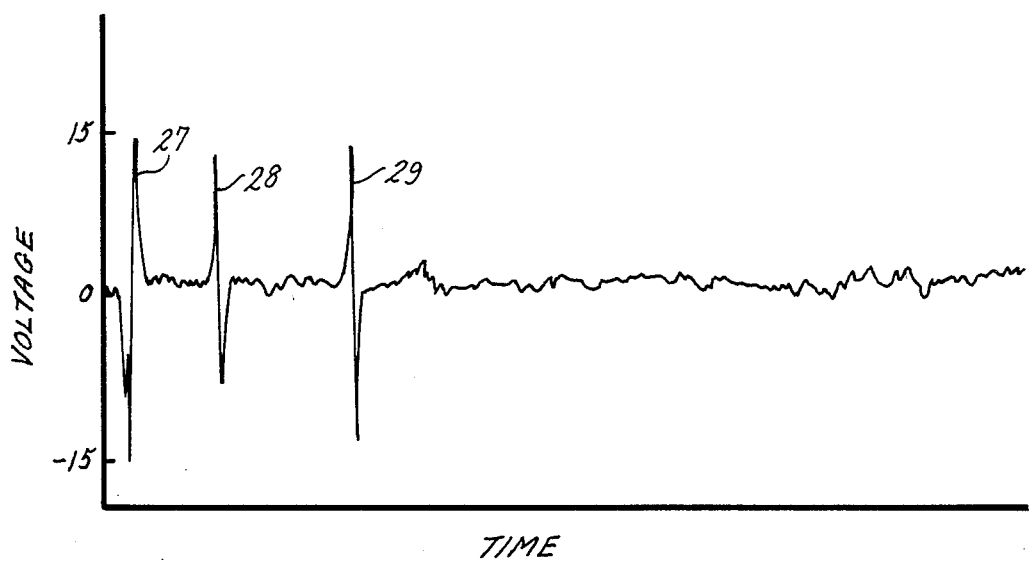
FIG. 4 shows the electrostatic signatures of a fighter aircraft.
Figure 5:
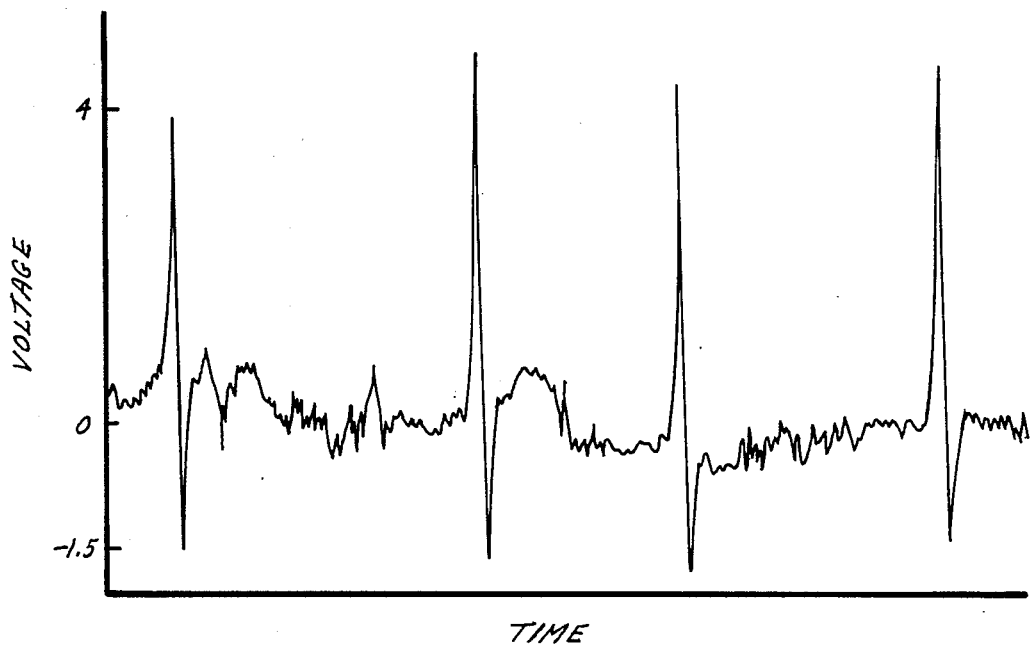
FIG. 5 shows the electrostatic signature of a commercial airliner.

When the electrostatic field in which the sensor 11, is present is disturbed by the appearance of a charged body, as depicted in FIG. 3, signals from each probe 12 are output to the high impedance amplifier 15 by way of signal links 14 and then to the differential amplifier 16. The output signal from differential amplifier 16 is the difference between the signals received from probes 12 with common mode rejection removing or minimizing other signal interference. That signal presented by display 17 represents the effect on the ambient electrostatic field caused by the intrusion of the charged body or charge bearing body and constitutes a characteristic or signature of that particular body within the spectrum of and as a function of its performance capability Characteristics and signatures for multiple detections of a particular type of military fighter aircraft are shown in FIG. 4 and for one particular type of commercial airliner in FIG. 5. In FIG. 4, the characteristic labeled 27 represents ion stream in the exhaust plume of the aircraft. Thus, the characteristic 27 representing positive ion exhaust plume first goes negative and then positive. The other two characteristics 28 in FIG. 4 are a result of the negative skin charge on each of two separate aircraft as they overflew sensor 11 only seconds apart. They go positive and then negative.

Figure 6:
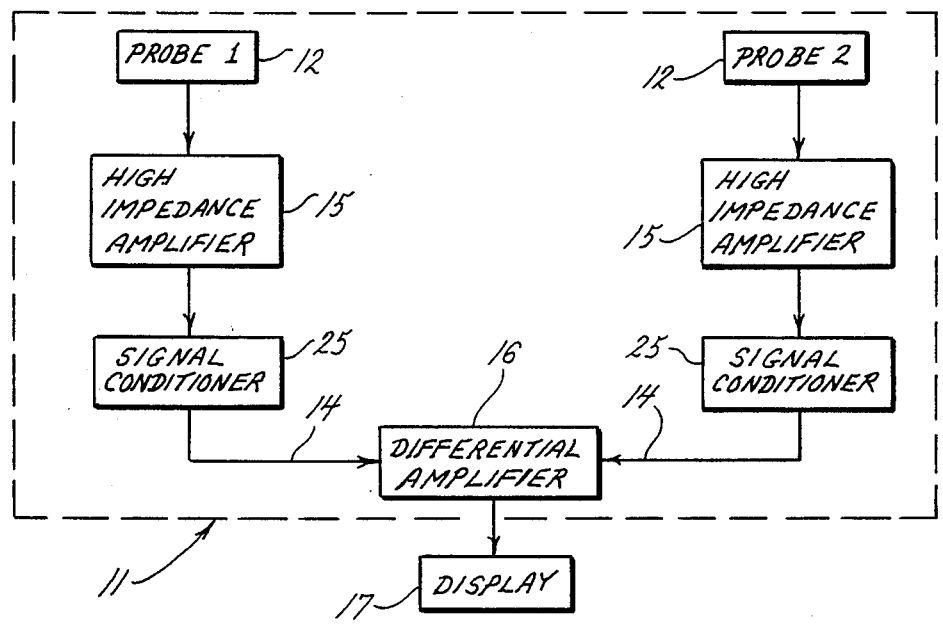
FIG. 6 is a block diagram of a sensor configuration for application where the probes are distant from each other and the charged object presenting to the field.

FIG. 6 presents sensor 11 with probes 12 located at a great distance from each other. The greater the distance between the two probes used to produce the detection signals, the greater the resultant signal differential. In FIG. 6 the immediate output signal from each probe 12 is transmitted to a nearby high impedance amplifier 15 which in turn feeds a signal conditioner 25 for preparing the signal for transmission to a remote differential amplifier 16 by means of signal link 14. Signal link 14 is a transmission line, such as a coax cable, a radio link, or a fiber optic cable. In the present embodiment, as shown in FIG. 6, signal link 14 is a 75 ohm coax cable. Appropriate transmitters and receivers known to those skilled in the art are, of course, required for radio and optical links. The signal output of differential amplifier 16 is presented by display 17 as the information bearing characteristic or signature.

Figure 7:
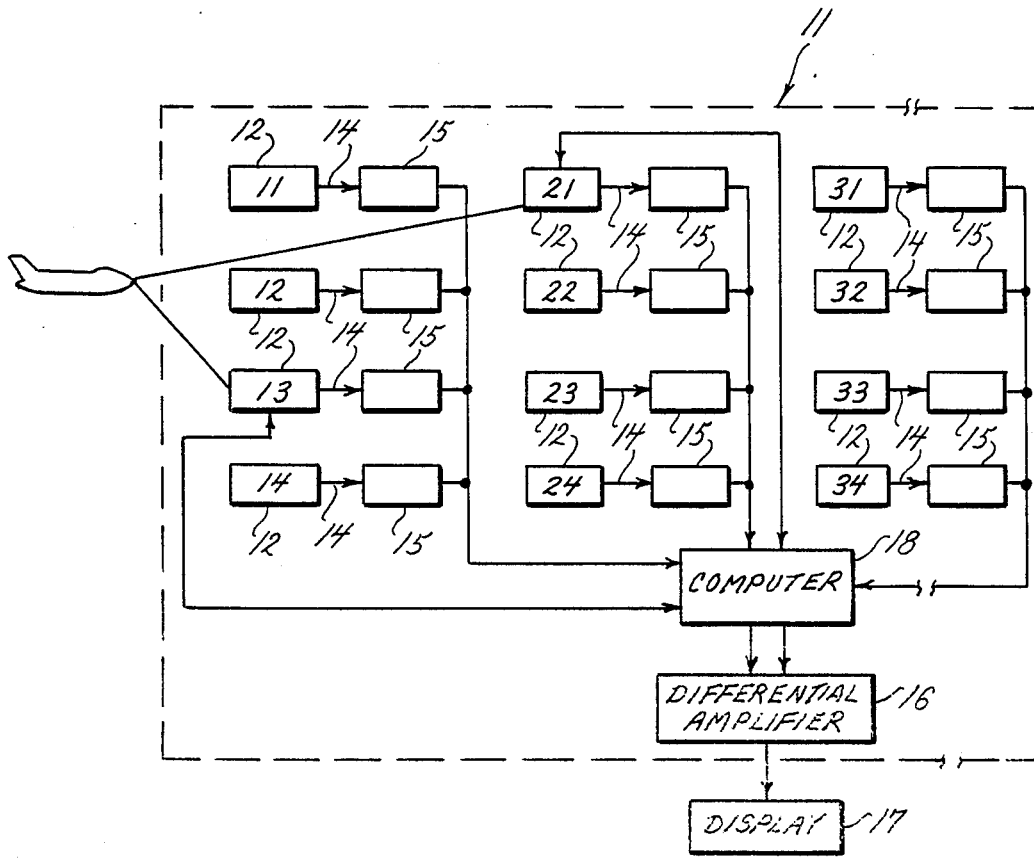
FIG. 7 is a block diagram of the computer optimized sensor.

FIG. 7 depicts sensor 11 with a multitude of probes 12 either seeded or specially arranged in a pattern or array relative to each other and to particular reference points in a geographical area. High impedance amplifiers 15 are shown located physically close to each respective probe 12 rather than remotely with differential amplifier 16. The remote configuration, though an alternative, generally results in a lower signal to noise ratio. Multiple signal processing both increases the signal-to-noise ratio and provides target location. Probes 12 are connected through high impedance amplifiers 15 to computer 18 which, in real time, continuously either selects the two probes yielding optimum signals resulting from disturbance of the ambient electrostatic field by a charged body or charge producing body affecting that field, of processing all received signals to improve the desired performance. The optimum signals are those which produce the greatest differential voltage at any point in time as a result of the field disturbance. Computer 18 directs the signals from the two selected probes to differential amplifier 16 to produce the output of sensor 11 to display 17 or records and processes data from all probes. The sensor in FIG. 7 produces a signal that provides detection, identification, location, and course information.

It should be understood that this description is by way of example only and that various changes in the configuration of the invention, including combinations and arrangements of parts may be made without departing from the spirit and scope of the invention as now claimed:

I claim:

1. An apparatus for detecting the presence of a charge bearing or charge producing body moving in an electric field comprising means for sensing disturbances in the electric field caused by the charge bearing or charge producing body moving in said field, the sensing means including:
   (a) a differential electrostatic voltmeter,
   (b) two electrostatic probes connected separately to the two separate inputs of said voltmeter, and
   (c) a display connected to said voltmeter to visually depict its output, the display providing means for indicating the presence of a charge bearing or charge producing body in said electric field.

2. An apparatus for detecting the presence of a charge bearing or charge producing body moving in an electric field comprising means for sensing disturbances in the electric field caused by the charge bearing or charge producing body moving in said field, the sensing means including:
   (a) a differential amplifier,
   (b) two electrostatic probes,
   (c) two high impedance amplifiers, each of which has one of said probes as its input, and the outputs of which are connected to the separate inputs of said differential amplifier, and
   (d) a display connected to said differential amplifier to visually depict its output, the display providing means for indicating the presence of a charge bearing or charge producing body in said electric field.

3. An apparatus for detecting the presence of a charge bearing or charge producing body moving in an electric field comprising means for sensing disturbances in the electric field caused by a charge bearing or charge producing body moving in said field, the sensing means including:
   (a) a plurality of electrostatic probes,
   (b) a high impedance amplifier connected to each probe,
   (c) a differential amplifier,
   (d) a means connected to each high impedance amplifier for selecting optimum signals for connection to the inputs to said differential amplifier, and
   (e) a display connected to the output of said differential amplifier to visually depict its output, the display providing means for indicating the presence of a charge bearing or charge producing body in said electric field.

4. The apparatus of claim 3, wherein said means for selecting optimum signals for connection to said differential amplifier is a computer.

5. An apparatus for detecting the presence of a charge producing body moving in an electric field comprising means for sensing disturbances in the electric field caused by the charge bearing or charge producing body moving in said field, the sensing means including:
   (a) a plurality of ionization probes,
   (b) a high impedance amplifier connected to the output of each of said probes,
   (c) a differential amplifier,
   (d) a means connected between each of said high impedance amplifiers and said differential amplifier for selecting the optimum pair of signals output from said high impedance amplifiers for input to said differential amplifier, and
   (e) a display for visually presenting the signal output of said differential amplier, the display providing means for indicating the presence of a charge bearing or charge producing body moving in said electric field.

6. The apparatus of claim 5, including means for connecting the output of each of said probes to the input of one of said high impedance amplifiers, the connecting means including a low-loss signal link.

7. An apparatus for detecting the presence of a charge producing body moving in an electric field comprising means for sensing disturbances in an electric field caused by a charge bearing or charge producing body moving in said field, the sensing means including:
   (a) means for sensing an electric field disturbance and for producing an output signal representing said disturbances, and
   (b) means connected to said sensing means for processing the disturbance sensing means output to produce information constituting a characteristic signal of said body causing the disturbance and identifying said body.

8. The apparatus of claim 7 wherein said means for sensing the electric field disturbance and producing an output representing it comprises a plurality of electrostatic field probes.

9. The apparatus of claim 8 wherein said plurality of electrostatic field probes comprises at least one pair connected in a differential mode to said processing means.

10. The apparatus of claim 9 wherein said means for processing the output of the sensing means to produce information about said disturbances further comprises:
  (a) means for selecting the two optimum outputs of said sensing means in real time,
  (b) a high impedance differential amplifier having as its inputs the two optimum outputs of said selection means, and
  (c) a display for visually presenting the output of said high impedance differential amplifier as a characteristic or signature of the body detected in the field.

11. The apparatus of claim 10 wherein each electrostatic field probe contains a source of free electrons to enhance its signal output.

12. The apparatus of claim 11 wherein said source of free electrons is a source of alpha particles.

13. The apparatus of claim 12 wherein said source of alpha particles is a radioactive material.

14. The apparatus of claim 13 wherein said radioactive material is Polonium.

15. The apparatus of claim 7 wherein said sensing means is a pair of ionization probes.

16. The apparatus of claim 7 further comprising: means for connecting said sensing means to said processing means.

17. The apparatus of claim 16 wherein said connecting means is a low-loss co-axial electrical signal conductor.

18. The apparatus of claim 17 wherein said means for connecting said sensing means to said processing means is a fiber optic conductor.

19. The apparatus of claim 7 further comprising: a means for amplifying the output of said sensing means, connected between said sensing means and said processing means.

20. The apparatus recited in claim 6 wherein said plurality of ionization probes are placed in an array.

21. The apparatus recited in claim 6 wherein said plurality of ionization probes are randomly seeded.

* * * * *